(12) United States Patent
Milner et al.

(10) Patent No.: US 12,111,222 B2
(45) Date of Patent: Oct. 8, 2024

(54) MANIFOLD ASSEMBLY DIGITAL PRESSURE GAUGE ADAPTER

(71) Applicant: ASPEN PUMPS LIMITED, Hailsham (GB)

(72) Inventors: Merlin Milner, Hailsham (GB); Chris Forshaw, Hailsham (GB)

(73) Assignee: Aspen Pumps Limited, Hailsham (GB)

( * ) Notice: Subject to any disclaimer, the term of this patent is extended or adjusted under 35 U.S.C. 154(b) by 351 days.

(21) Appl. No.: 17/594,091

(22) PCT Filed: Apr. 1, 2020

(86) PCT No.: PCT/GB2020/050870
§ 371 (c)(1),
(2) Date: Oct. 1, 2021

(87) PCT Pub. No.: WO2020/201750
PCT Pub. Date: Oct. 8, 2020

(65) Prior Publication Data
US 2022/0170807 A1    Jun. 2, 2022

(30) Foreign Application Priority Data

Apr. 2, 2019  (GB) .................................. 1904574

(51) Int. Cl.
*G01L 9/06* (2006.01)
*G01L 19/00* (2006.01)
(Continued)

(52) U.S. Cl.
CPC .............. *G01L 9/06* (2013.01); *G01L 19/003* (2013.01); *G01L 19/086* (2013.01); *G01L 19/16* (2013.01)

(58) Field of Classification Search
CPC . G01L 19/147; G01L 9/0072; G01L 19/0645; G01L 19/0084; G01L 13/025;
(Continued)

(56) References Cited

U.S. PATENT DOCUMENTS 4,582,089 A * 4/1986 Nimberger .......... G01L 19/0015
285/414
4,745,810 A * 5/1988 Pierce ................... G01L 19/148
73/717

(Continued)

FOREIGN PATENT DOCUMENTS

EP      1550852 A2   12/2004
WO   2018144274 A1    8/2018

OTHER PUBLICATIONS

Search Report for corresponding Application No. GB1904574.9 dated Dec. 2, 2019, 2 pages.
(Continued)

*Primary Examiner* — Andre J Allen
(74) *Attorney, Agent, or Firm* — Seyfarth Shaw LLP

(57) ABSTRACT

The present application provides an adapter (20) for a manifold gauge assembly (1) for use on a fluid system, for example an HVAC-R system. The manifold gauge assembly (1) comprises a manifold (3) for connection to the fluid system, and a pressure gauge (14) arranged to detect a fluid pressure in the manifold (3). The adapter (20) comprises a tube (23) having connectors (27, 28) for fluidly connecting the adapter (20) to the pressure gauge (14) and to the manifold (3). The adapter also includes an electronic pressure sensor (21) arranged to detect a fluid pressure in the tube (23), and a communications unit (22) configured to receive data from the electronic pressure sensor (21) and to communicate with a remote device (32).

8 Claims, 10 Drawing Sheets

(51) Int. Cl.
*G01L 19/08* (2006.01)
*G01L 19/16* (2006.01)

(58) Field of Classification Search
CPC ............. G01L 19/0007; G01L 19/0038; G01L 19/0042; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/065; G01L 9/12; G01L 19/0618; G01L 9/0052; G01L 7/16; G01L 9/125; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0069; G01L 19/0015; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 11/008; G01L 13/026; G01L 7/22; G01L 9/0047; G01L 13/00; G01L 9/0025; G01L 9/0076; G01L 7/08; G01L 9/0035; G01L 19/0061; G01L 9/0005; G01L 9/0019; G01L 9/0041; G01L 21/00; G01L 9/10; G01L 9/08; G01L 9/04; G01L 11/006; G01L 19/086; G01L 9/008; G01L 1/18; G01L 11/004; G01L 19/069; G01L 19/083; G01L 9/0057; G01L 9/00; G01L 19/10; G01L 19/16; G01L 19/06; G01L 9/0016; G01L 9/0048; G01L 13/023; G01L 7/048; G01L 9/0027; G01L 9/086; G01L 9/0079; G01L 11/04; G01L 9/0091; G01L 1/20; G01L 11/002; G01L 23/24; G01L 27/00; G01L 7/182; G01L 1/02; G01L 19/0663; G01L 7/166; G01L 23/22; G01L 9/0036; G01L 9/0061; G01L 9/0039; G01L 23/125; G01L 9/0013; G01L 19/145; G01L 9/0092; G01L 21/04; G01L 9/0045; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 23/16; G01L 7/088; G01L 7/163; G01L 9/0007; G01L 13/06; G01L 23/222; G01L 1/16; G01L 1/2287; G01L 9/0085; G01L 9/025; G01L 1/2212; G01L 21/14; G01L 9/0004; G01L 9/003; G01L 23/02; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 19/149; G01L 21/10; G01L 7/024; G01L 1/246; G01L 7/086; G01L 1/005; G01L 7/06; G01L 1/2206; G01L 5/228; G01L 7/102; G01L 13/021; G01L 27/02; G01L 1/2262; G01L 1/24; G01L 1/26; G01L 19/144; G01L 23/00; G01L 9/0094; G01L 9/0082; G01L 1/125; G01L 11/06; G01L 21/30; G01L 9/0097; G01L 1/2268; G01L 21/34; G01L 23/221; G01L 7/187; G01L 7/20; G01L 1/146; G01L 23/26; G01L 7/068; G01L 1/225; G01L 23/32; G01L 7/14; G01L 1/44; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 21/32; G01L 5/18; G01L 1/245; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/004; G01L 5/0052; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 5/24; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/166; G01L 7/185; G01L 1/255; G01L 21/08; G01L 5/0057; G01L 5/1627; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106
USPC .................................................. 73/700–756
See application file for complete search history.

(56) References Cited

U.S. PATENT DOCUMENTS

| | | | |
|---|---|---|---|
| 6,871,546 B2* | 3/2005 | Scheurich | G01L 19/0084 73/725 |
| 10,452,061 B2* | 10/2019 | Yenni | F24F 11/49 |
| 10,663,959 B2* | 5/2020 | Yenni | G05B 15/02 |
| 2001/0039964 A1* | 11/2001 | Gul | G01L 19/0015 137/557 |
| 2004/0113813 A1 | 6/2004 | Henson et al. | |
| 2009/0183516 A1 | 7/2009 | Appler et al. | |

(56) References Cited

U.S. PATENT DOCUMENTS

| | | |
|---|---|---|
| 2015/0048955 A1 | 2/2015 | Pereira et al. |
| 2015/0292985 A1 | 10/2015 | Yenni et al. |
| 2016/0003509 A1 | 1/2016 | Pistone et al. |
| 2016/0076783 A1 | 3/2016 | Whitehead |
| 2018/0223242 A1 | 8/2018 | Fadell et al. |
| 2019/0039440 A1* | 2/2019 | Calderone ............ B60K 7/0007 |

OTHER PUBLICATIONS

Combined Search and Examination Report for corresponding Application No. GB1904574.9 dated Sep. 17, 2019, 9 pages.
PCT International Search Report for corresponding Application No. PCT/GB2020/050870 dated Oct. 30, 2020, 5 pages.
Written Opinion for corresponding Application No. PCT/GB2020/050870 dated Oct. 30, 2020, 12 pages.

* cited by examiner

MANIFOLD ASSEMBLY DIGITAL PRESSURE GAUGE ADAPTER

CROSS REFERENCE TO RELATED APPLICATIONS

This is a U.S. National Stage Application of, and claims the benefit to, PCT/GB2020/050870, filed Apr. 1, 2020, which claims priority to United Kingdom patent application s/n GB 1904574.9, filed Apr. 2, 2019, the contents of each is incorporated herein by reference in its entirety.

This invention relates to an adapter for a manifold gauge assembly having a manifold and a pressure gauge, for example a manifold gauge assembly for use in HVAC-R maintenance or commissioning. The present invention also relates to a manifold gauge assembly, and a method of adapting a manifold gauge assembly.

BACKGROUND

Heating, ventilation, air conditioning and refrigeration (HVAC-R) systems typically use a refrigerant fluid to transfer heat from one area to another in order to cool and/or heat specific areas.

During HVAC-R system maintenance and commissioning tools are used for detecting pressure and other factors of the refrigerant within an HVAC-R system. Traditionally, a manifold is connected to high pressure and low pressure service ports of an HVAC-R system, and the manifold includes an output pipe. The manifold can be used to select which of the high pressure and low pressure service ports is open to the output pipe. Analog pressure gauges are provided on the manifold to measure the pressure of refrigerant on the high pressure and low pressure service ports.

It is known to replace the analog gauges with digital gauges that display the pressure reading digitally. Such digital gauges may be provided with Bluetooth for communication with an application on a mobile phone or tablet.

BRIEF SUMMARY OF THE DISCLOSURE

In accordance with the present disclosure there is provided an adapter for a manifold gauge assembly for use on a fluid system, for example an HVAC-R system, the manifold gauge assembly comprising a manifold for connection to the fluid system, and a pressure gauge arranged to detect a fluid pressure in the manifold, and wherein the adapter comprises:
- a tube having connectors for fluidly connecting the adapter between the pressure gauge and the manifold,
- an electronic pressure sensor arranged to detect a fluid pressure in the tube, and
- a communications unit configured to receive data from the electronic pressure sensor and to communicate with a remote device.

The communications unit preferably comprises a Bluetooth communications unit. In other examples, the communications unit comprises alternative a radio-frequency communications unit, for example Wi-Fi or Zigbee.

The tube preferably comprises an opening, and the electronic pressure sensor is preferably mounted in the opening.

In examples, the tube comprises a first connector for connection to the pressure gauge and a second connector for connection to the manifold such that the pressure gauge is connectable to the manifold by the tube.

The first connector may comprise a female threaded connector, and the second connector comprises a male threaded connector. Preferably, the threaded connector comprises a ⅛ inch NPT thread. However, in other examples this arrangement may be reversed, or the connectors may comprise other connectors without a thread, for example a push-fit connector, a barbed connector, a sleeve connector, or a nipple connector.

In preferred examples, the adapter further comprises a power source, for example a battery or a connection for an external power source such as a mains supply.

In preferred examples, the manifold gauge assembly comprises a first pressure gauge and a second pressure gauge. In these examples, the adapter may further comprise:
- a second tube having connectors for fluidly connecting the adapter to the manifold and to the second pressure gauge, and
- a second electronic pressure sensor arranged to detect a fluid pressure in the second tube.

The adapter may further comprise a second tube comprising the second connectors. In this example, the second electronic pressure sensor is preferably arranged to detect a fluid pressure in the second tube. The second tube may comprise an opening, and the second electronic pressure sensor may be mounted in the opening. The second tube preferably comprises a first connector for connection to the second pressure gauge and a second connector for connection to the manifold such that the second pressure gauge is connectable to the manifold by the second tube.

In some examples, the first connector of the second tube preferably comprises a female threaded connector, and the second connector of the second tube preferably comprises a male threaded connector. Preferably, the threaded connector comprises a ⅛ inch NPT thread. However, in other examples this arrangement may be reversed, or the connectors may comprise other connectors without a thread, for example a push-fit connector, a barbed connector, a sleeve connector, or a nipple connector.

In one example, the communications unit is arranged to receive data from the electronic pressure sensor and from the second electronic pressure sensor, and to communicate with a remote device.

In an alternative example, the adapter further comprises a second communications unit configured to receive data from the second electronic pressure sensor, and to communicate with a remote device.

In accordance with the present disclosure there is also provided a manifold gauge assembly for use on a fluid system, for example an HVAC-R system, the manifold gauge assembly comprising:
- a manifold for connection to the fluid system,
- a pressure gauge arranged to detect a fluid pressure in the manifold, the pressure gauge comprising a display to display a detected pressure,
- an electronic pressure sensor arranged to detect a pressure between the manifold and the pressure gauge, and
- a communications unit arranged to receive data from the electronic pressure sensor and to communicate with a remote device.

Preferably, the electronic pressure sensor is disposed between the manifold and the pressure gauge.

In examples, the manifold gauge assembly comprises a connecting tube disposed between the manifold and the pressure gauge. The connecting tube preferably comprises a connector for removably connecting the pressure gauge to the connecting tube, and the electronic pressure sensor is preferably disposed in the connecting tube.

In examples, the connecting tube may further comprise a connector for removably connecting the connecting tube to the manifold. In further examples, the connecting tube may be joined to the manifold, or may be a part of the manifold. The connecting tube may be permanently attached to the manifold.

In preferred examples, the connecting tube comprises an opening, and the electronic pressure sensor may be disposed in the opening.

In preferred examples, the manifold gauge assembly comprises a first pressure gauge arranged to detect a first fluid pressure in the manifold, and a second pressure gauge arranged to detect a second fluid pressure in the manifold. Each of the first pressure gauge and the second pressure gauge may comprise a display to display a detected pressure. In this example, the manifold gauge assembly may further comprise a first electronic pressure sensor arranged to detect pressure between the manifold and the first pressure gauge, and a second electronic pressure sensor arranged to detect pressure between the manifold and the second pressure gauge.

In one example, the communications unit may be configured to receive data from the first electronic pressure sensor and from the second electronic pressure sensor.

In an alternative example, the manifold gauge assembly may comprise a first communications unit configured to receive data from the first electronic pressure sensor, and a second communications unit configured to received data from the second electronic pressure sensor.

In some examples, the pressure gauge may comprise an analog pressure gauge, and the display may comprise a dial. In other examples, the pressure gauge may comprise an electronic pressure gauge having an electronic pressure sensor, and the display may comprise a digital display.

In preferred examples, the remote device comprises a mobile phone, tablet computer, laptop computer, or other portable computing device. The remote device preferably comprises a communications unit having at least a receiver for receiving pressure data from the one or more electronic pressure sensors of the adapter or manifold gauge assembly. The remote device preferably also comprises a display configured to display the received pressure data. The remote device may additionally include a processor configured to process the pressure data, and/or a memory to store the pressure data and/or processed pressure data.

The remote device may be configured to log the detected pressure, for example for monitoring a maintenance or commissioning procedure, for quality assurance, or for regulatory compliance. In further examples, the remote device may be configured to control the air conditioning system or maintenance apparatus used with the air conditioning system. In one example, the remote device is configured to control operation of a refrigerant recovery unit. In this way, the refrigerant recovery unit may be operated in dependence on the pressure detected by the electronic pressure sensor or sensors of the adapter or manifold gauge assembly. For example, the remote device may be configured to operate the recovery unit until the detected refrigerant pressure is zero, indicating that the refrigerant has been fully recovered from the air conditioning system. In some examples, the remote device may be configured to control an electronic actuator arranged to control a valve of the manifold gauge assembly. The valves may be controlled in dependence on the detected pressure.

In some examples, the adapter, or the manifold gauge assembly, comprises the remote device. In one example, an adapter kit comprises one or more adapters and a remote device. In other examples, an adapter kit comprises or one or more adapters and instructions and/or authorisation to download and/or install computing software, for example an application, to a device to be operated as the remote device. For example, one or more of the adapters may be sold together with authorisation for installing an application on a tablet computer, the tablet computer being the remote device after installation of the application.

In accordance with the present disclosure there is also provided a gauge manifold assembly for use on a fluid system, for example an HVAC-R system, the gauge manifold assembly comprising:
  a manifold for connection to the fluid system,
  a pressure gauge arranged to detect a fluid pressure in the manifold, the pressure gauge comprising a display to display a detected pressure, and
  an adapter tube comprising:
    a first connector for connection to the manifold
    a second connector for connection to the pressure gauge, and
    a third connector for connection to an electronic pressure detector device,
  wherein the manifold is connected to the first connector of the adapter tube and the pressure gauge is connected to second connector of the adapter tube such that the adapter tube is connected between the pressure gauge and the manifold.

In preferred examples, the gauge manifold assembly also comprises an electronic pressure detector device connected to the third connector of the adapter tube. In particular, the gauge manifold assembly may further comprise an electronic pressure detector device connected to the third connector of the adapter tube, and the electronic pressure detector device may comprise an electronic pressure sensor. The electronic pressure detector device may further comprise a communications unit arranged to receive data from the electronic pressure sensor and communicate with a remote device.

Preferably, the first connector comprises a male threaded connector, for example a ⅛ inch threaded connector. Similarly, the second connector may comprise a female threaded connector, for example a ⅛ inch threaded connector, and the third connector may comprise a male threaded connector, for example a ⅛ inch threaded connector. One or more of the first, second and third connectors may be an industry standard connector so that the connectors can be used with various apparatus. Preferably, each of the first, second and third connectors each comprises a ⅛ inch NPT thread.

In accordance with the present disclosure there is also provided an adapter kit for a gauge manifold assembly having a manifold and a pressure gauge, the adapter kit comprising:
  an electronic pressure detector device comprising an electronic pressure sensor and a connector, and
  an adapter tube comprising:
    a first connector for connection to the manifold,
    a second connector for connection to the pressure gauge, and
    a third connector for connection to the electronic pressure detector device,
  wherein the first, second and third connectors are in fluid communication within the adapter tube such that during use the pressure gauge and the electronic pressure sensor both detect a fluid pressure in the manifold.

The electronic pressure detector device preferably further comprises a communications unit arranged to receive data from the electronic pressure sensor and to communicate with a remote device.

Preferably, the first connector comprises a male threaded connector, for example a ⅛ inch threaded connector. Similarly, the second connector may comprise a female threaded connector, for example a ⅛ inch threaded connector, and the third connector may comprise a male threaded connector, for example a ⅛ inch threaded connector. One or more of the first, second and third connectors may be an industry standard connector so that the connectors can be used with various apparatus. Preferably, each of the first, second and third connectors comprises a ⅛ inch NPT thread In accordance with the present disclosure there is also provided an adapter tube configured for in the adapter kit.

In accordance with the present disclosure there is also provided a method of adapting a manifold gauge assembly having a manifold and a pressure gauge, the method comprising:

disconnecting the pressure gauge from the manifold, and
attaching the adapter or adapter kit described above to the manifold and to the pressure gauge.

It will be understood that any data processing, can be performed by a device having one or more processors and a memory including instructions to cause the one or more processors to perform the data processing, such as to process the scan data to generate the control data. The memory is typically a non-transient computer-readable storage medium.

BRIEF DESCRIPTION OF THE DRAWINGS

Embodiments of the invention are further described hereinafter with reference to the accompanying drawings, in which.

DETAILED DESCRIPTION

Figure 1A:
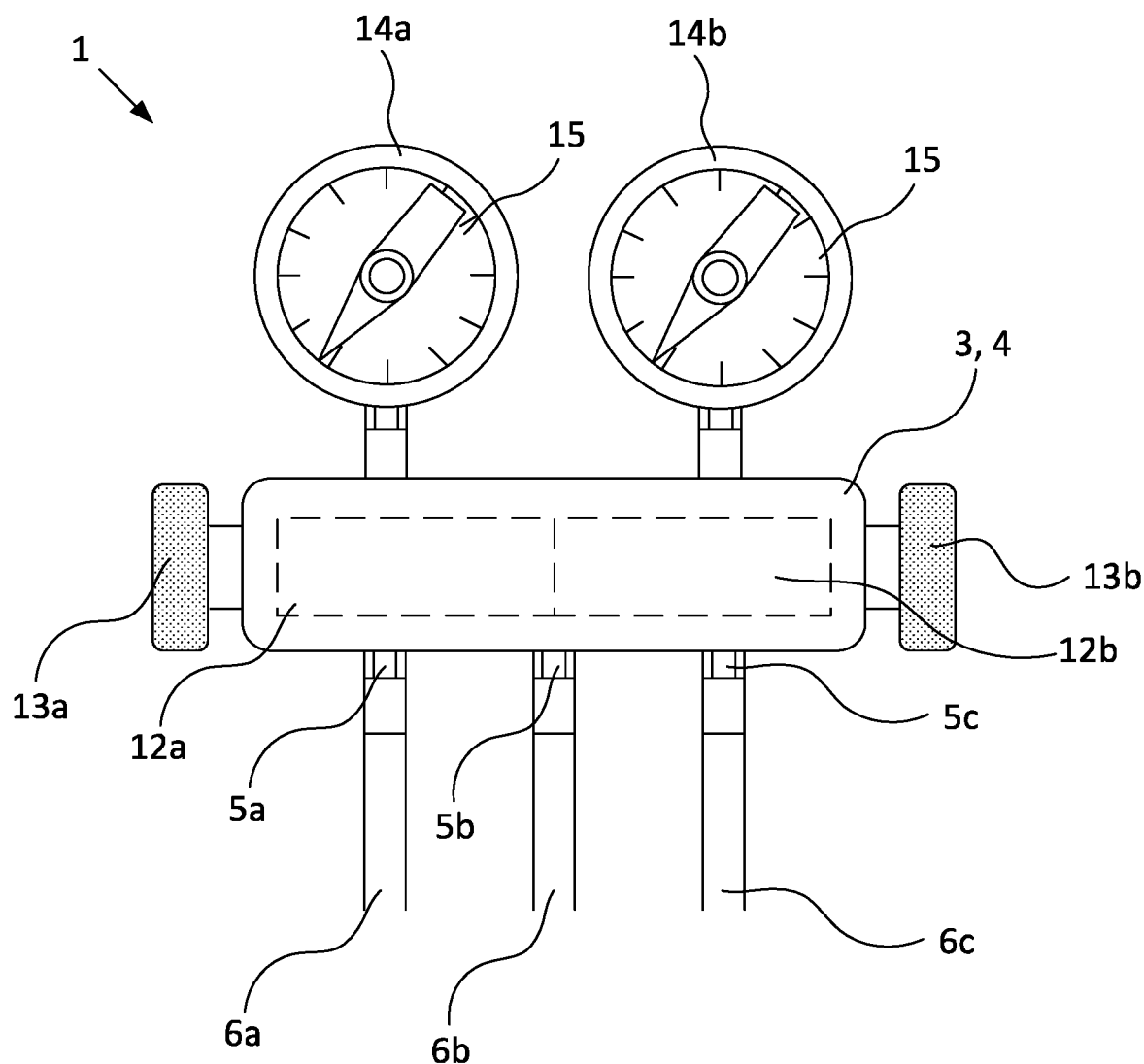
FIG. 1A shows a manifold gauge assembly for use in HVAC-R maintenance.
Figure 1B:
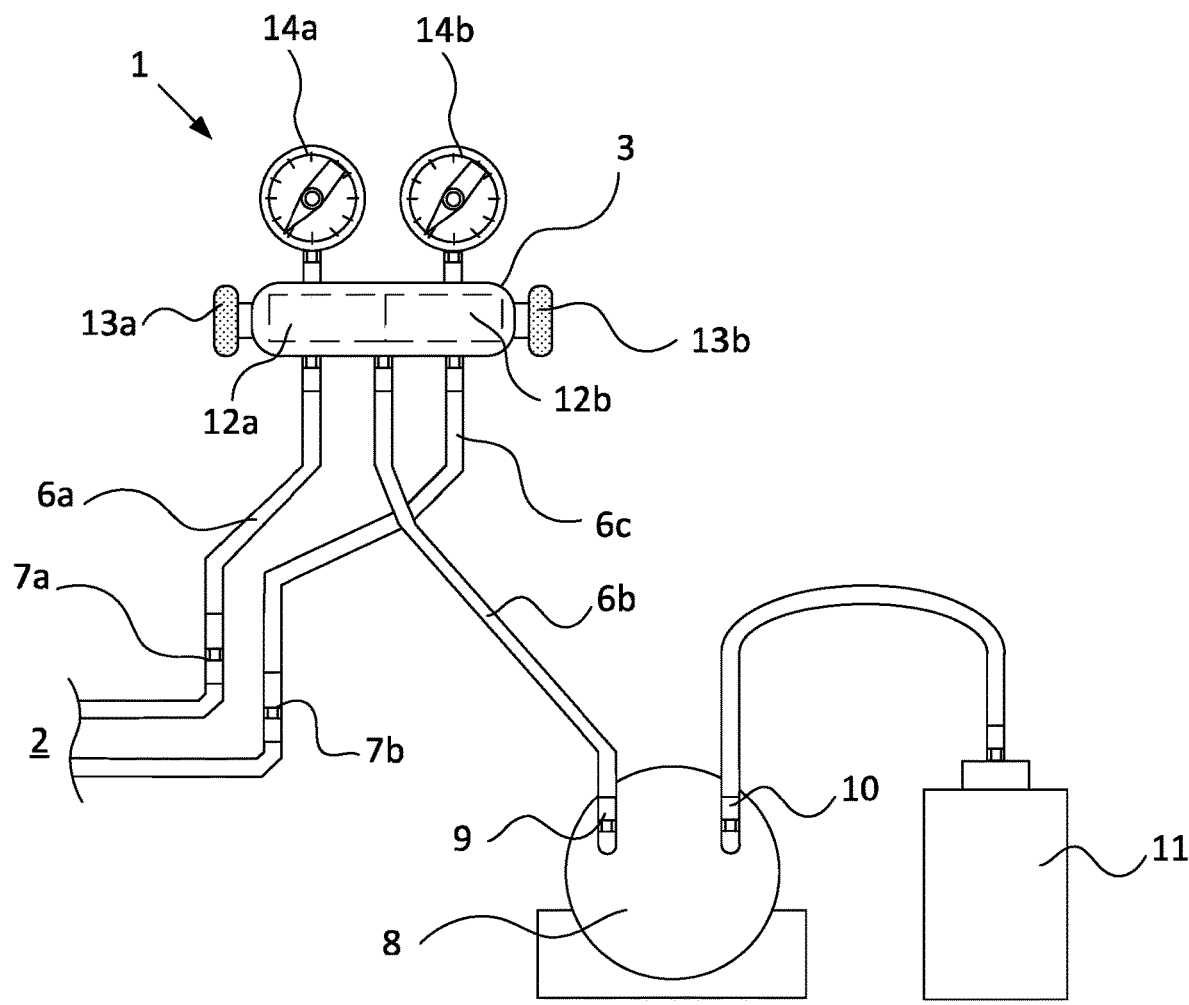
FIG. 1B shows the manifold gauge assembly of FIG. 1A connected to an HVAC-R system and to a refrigerant tank.

FIGS. 1A and 1B show a manifold gauge assembly 1 for use with a heating, ventilation, air conditioning and/or refrigeration (HVAC-R) system, for example an air conditioning system 2. The manifold gauge assembly 1 has a manifold 3 that is formed of a body 4 having connections 5a, 5b, 5c for three hoses—a low pressure hose 6a, a high pressure hose 6c, and a switching hose 6b. As shown in FIG. 1B, during maintenance of an air conditioning system 2 the low pressure hose 6a is connected to a low pressure service port 7a of the air conditioning system 2, the high pressure hose 6c is connected to a high pressure service 7b port of the air conditioning system 2, and the switching hose 6b is connected to maintenance equipment, in this example a refrigerant recovery unit 8. Specifically, in this example the switching hose 6b is connected to an intake 9 of the recovery unit 8, and an outlet 10 of the recovery unit 8 is connected to a refrigerant tank 11.

The recovery unit 8 includes a pump that draws refrigerant from the air conditioning system 2 and provides it to the refrigerant tank 11. The recovery unit 8 has two settings, a liquid recovery setting in which refrigerant is drawn from the high pressure service port 7b of the air conditioning system 2, and a vapour recovery setting in which refrigerant is drawn from the low pressure service port 7a of the air conditioning system 2. Depending on the specifications of the air conditioning system 2, one or both of a liquid recovery procedure and a vapour recovery procedure may be performed to recover all refrigerant from the air conditioning system 2 and provide it to the refrigerant tank 11.

The manifold gauge assembly 1 includes valves 12a, 12b, operated by actuators, in this example knobs 13a, 13b. The valves 12a, 12b control fluid connections within the manifold 3. The manifold 3 includes a low side valve 12a controlled by a low side knob 13a, and a high side valve 12b controlled by a high side knob 13b. The low side valve 12a controls a fluid connection between the low pressure hose 6a and the switching hose 6b. The high side valve 12b controls a fluid connection between the high pressure hose 6c and the switching hose 6b. In this way, the low side and high side valves 12a, 12b can be controlled using the knobs 13a, 13b to fluidly connect the low pressure hose 6a to the switching hose 6b, or to connect the high pressure hose 6c to the switching hose 6b, or to connect both of the low and high pressure hoses 6a, 6c to the switching hose 6b. The low side and high side valves 12a, 12b are configured according to what maintenance or commissioning procedure is being performed.

For example, for vapour recovery using the refrigerant recovery unit 8 shown in FIG. 1B, the high side valve 12b is closed by turning the high side knob 13b, and the low side valve 12a is opened by turning the low side knob 13a. This provides a fluid connection between the intake 9 of the refrigerant recovery unit 8 and the low pressure service port 7a of the air conditioning system 2, via the manifold 3.

As illustrated, the manifold gauge assembly 1 also includes two pressure gauges 14a, 14b. A low side pressure gauge 14a is arranged to detect fluid pressure in the manifold 3 between the low pressure hose 6a and the switching hose 6b, and a high side pressure gauge 14b is arranged to detect fluid pressure in the manifold 3 between the high pressure hose 6c and the switching hose 6b. Specifically, the low side pressure gauge 14a is arranged to detect pressure between the low side valve 12a and the switching hose 6b, so that the detected pressure is dependent on the position of the low side valve 12a (i.e. open or closed). Similarly, the high side pressure gauge 14b is arranged to detect pressure between the high side valve 12b and the switching hose 6b, so that the detected pressure is dependent on the position of the high side valve 12b (i.e. open or closed). The pressure gauges 14a, 14b are used to inform the operator of the fluid pressures during maintenance or commissioning procedures performed on the air conditioning system 2.

The pressure gauges 14a, 14b are attached to the manifold 3 by threaded connection, typically a ⅛ inch (3.175 mm) NPT threaded connection. The pressure gauges 14a, 14b typically comprise a male threaded connector, and the manifold typically comprises a compatible female threaded connector.

As illustrated in FIGS. 1A and 1B, in this example the pressure gauges 14a, 14b are analog pressure gauges, each having a dial 15, formed by a scale and a pointer, to display the detected pressure. An analog pressure gauge comprises a mechanical pressure sensor, for example a bourdon tube or a bellows arrangement.

In other examples, the pressure gauge may be a digital pressure gauge, and they may include a digital display to display the detected pressure. The digital pressure gauge may comprise an electronic pressure sensor, for example a piezoresistive strain gauge, and the measurement is displayed on the digital display, for example an LCD or LED screen.

Figure 2:
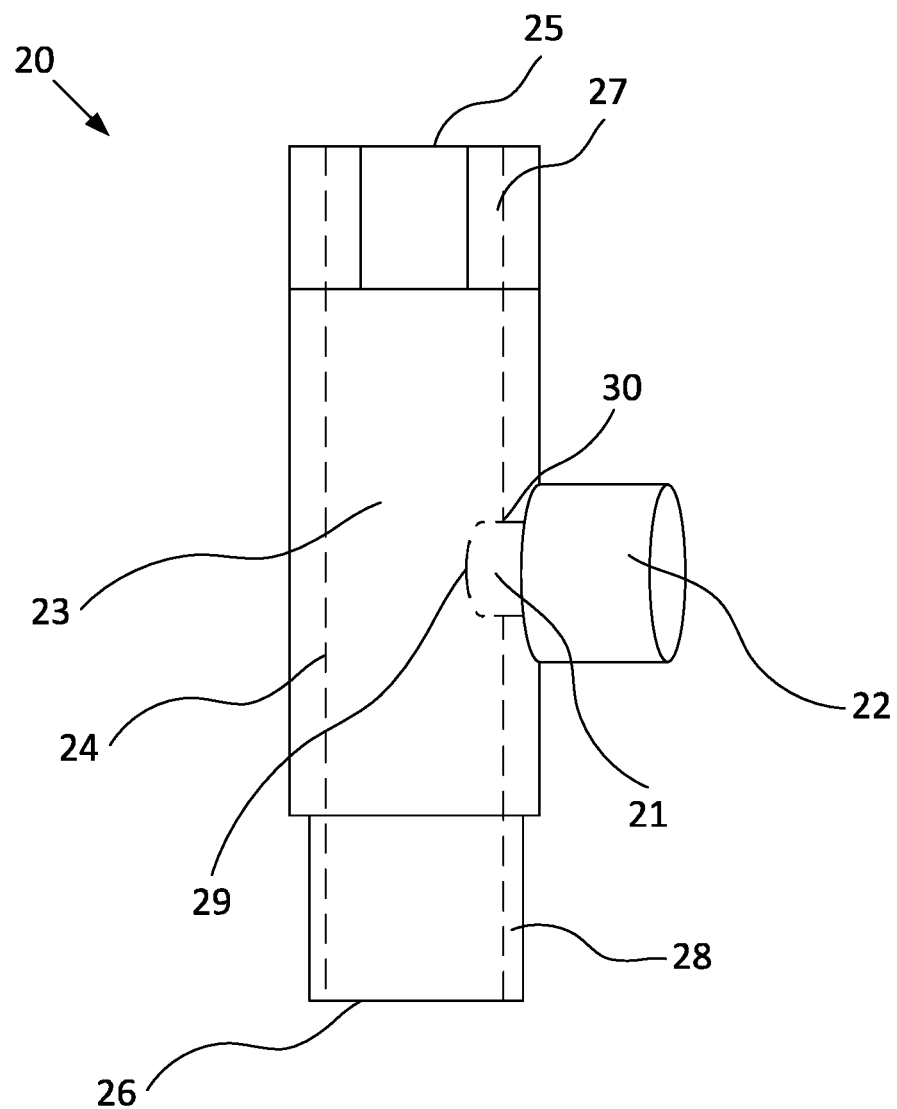
FIG. 2 shows an adapter for use with the manifold gauge assembly of FIGS. 1A and 1B.
Figure 3:
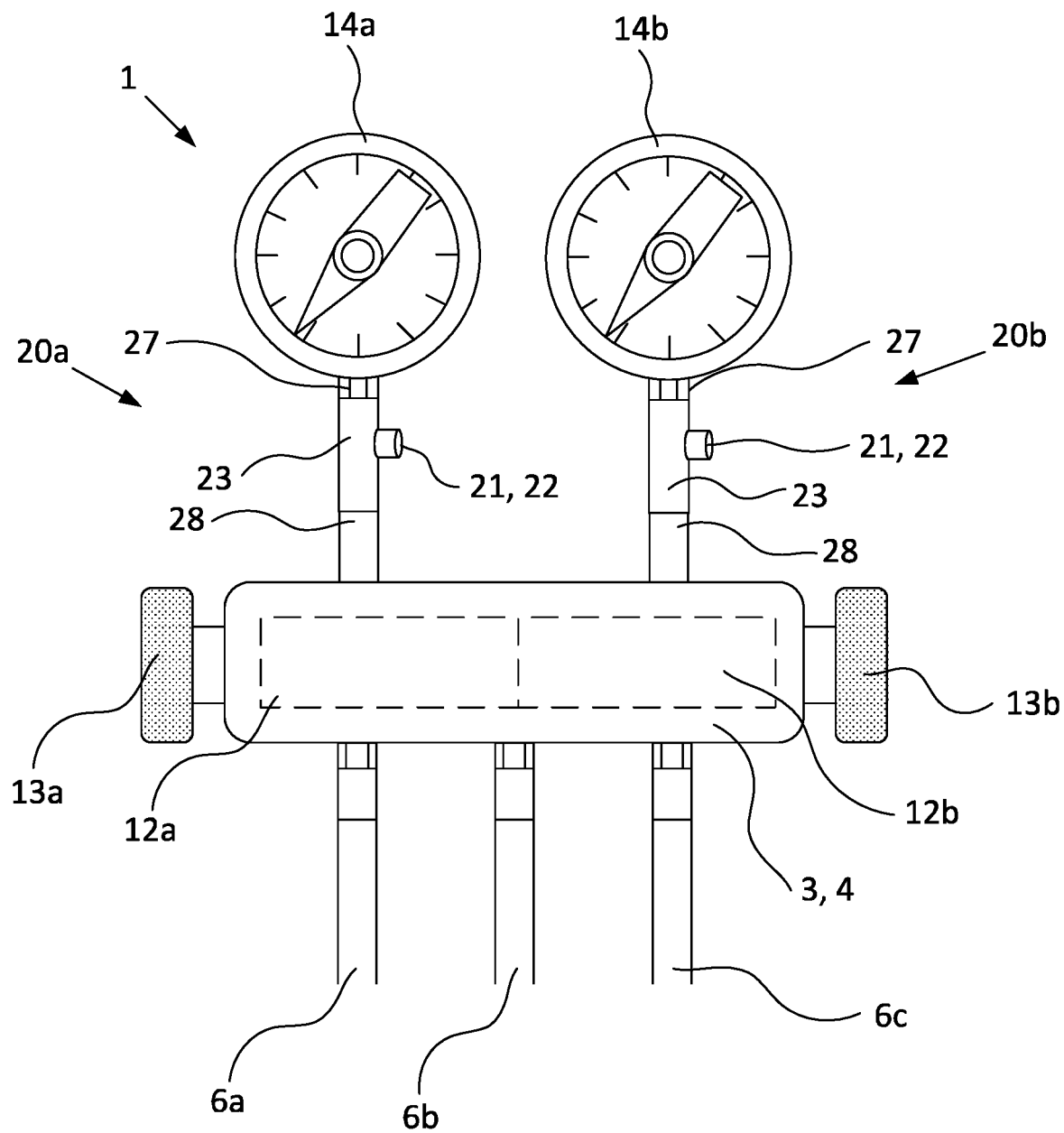
FIG. 3 shows the manifold gauge assembly of FIGS. 1A and 1B with two of the adapters of FIG. 2.

The adapter 20 illustrated in FIG. 2 is for attachment to the manifold gauge assembly 1 described with reference to FIGS. 1A and 1B. As shown in FIG. 3, an adapter 20 is attached to the manifold gauge assembly 1 between the manifold 3 and each pressure gauge 14a, 14b. As explained further hereinafter, the adapter 20 includes an electronic pressure sensor 21 and a communications unit 22, for example a Bluetooth communications unit. As explained hereinafter, the adapter 20 can be used to adapt the manifold gauge assembly 1 of FIGS. 1A and 1B to include data connectivity for providing pressure data to a remote device.

As illustrated in FIGS. 2 and 3, the adapter 20 includes a tube 23 that defines a fluid path 24 through the adapter 20 between a first end 25 and a second end 26. A first connector 27 is provided at the first end 25, and a second connector 28 is provided at the second end 26. The first connector 27 is configured for connection to a pressure gauge 14a, 14b, and the second connector 28 is configured for connection to the manifold 3. Therefore, as shown in FIG. 3, the adapter 20 can be connected between the manifold 3 and a pressure gauge 14a, 14b. In particular, the pressure gauge 14a, 14b is mounted to the manifold 3 by the adapter 20, in particular the tube 23. The adapter 20 is attached by disconnecting the pressure gauge 14a, 14b from the manifold 3, and then connecting the adapter 20 to the manifold 3 and to the pressure gauge 14a, 14b. As shown in FIG. 3, a first adapter 20a is connected between the manifold 3 and the low pressure gauge 14a, and a second adapter 20b is connected between the manifold 3 and the high pressure gauge 14b.

The connectors 27, 28 of the adapter 20 are compatible with the connectors on the manifold 3 and the connectors on the pressure gauges 14a, 14b. Typically, the connectors 27, 28 are ⅛ inch (3.175 mm) NPT threaded connectors. As shown in FIG. 2, the first connector 27 comprises a female threaded connector, including a locking nut, for connection to a male threaded connector of the pressure gauge 14a, 14b. The second connector 28 of the adapter 20 comprises a male threaded connector for connection to a female threaded connector of the manifold 3. However, it will be appreciated that any type of connector or arrangement of connectors may alternatively be used to provide a connection between the adapter 20 and the manifold 3, and between the adapter 20 and the pressure gauge 14a, 14b. For example, a range of adapters 20 with different size of type connectors 27, 28 may be provided for compatibility with manifold gauge assemblies 1 having different connectors.

The adapter 20 also includes an electronic pressure sensor 21. The electronic pressure sensor 21 is arranged to detect pressure between the first and second connectors 27, 28. That is, after connection to the manifold gauge assembly 1 as shown in FIG. 3, the electronic pressure sensor 21 is arranged to detect the pressure within the manifold 3. Due to the fluid connection between the pressure gauge 14a, 14b and the adapter 20, the electronic pressure sensor 21 detects the same pressure as the pressure gauge 14a, 14b.

The electronic pressure sensor 21 may comprise any electronic pressure sensor, for example a piezoresistive strain gauge, a capacitive pressure sensor, an electromagnetic pressure sensor, or a piezoelectric pressure sensor. Preferably, the electronic pressure sensor 21 comprises a sensing face 29 that is disposed within the tube 23 of the adapter 20, specifically within the fluid path 24. In this example, the tube 23 may comprise an opening 30 in which the electronic pressure sensor 21 is mounted. For example, the opening 30 may be a threaded opening in a side wall of the tube 23, and the electronic pressure sensor 21 may comprise a male thread to connect to the opening 30 of the adapter 20. The electronic pressure sensor 21 may be removably attached to the tube 23, or the electronic pressure sensor 21 may be integrated with the tube 23 such that it is not removable.

Figure 4:
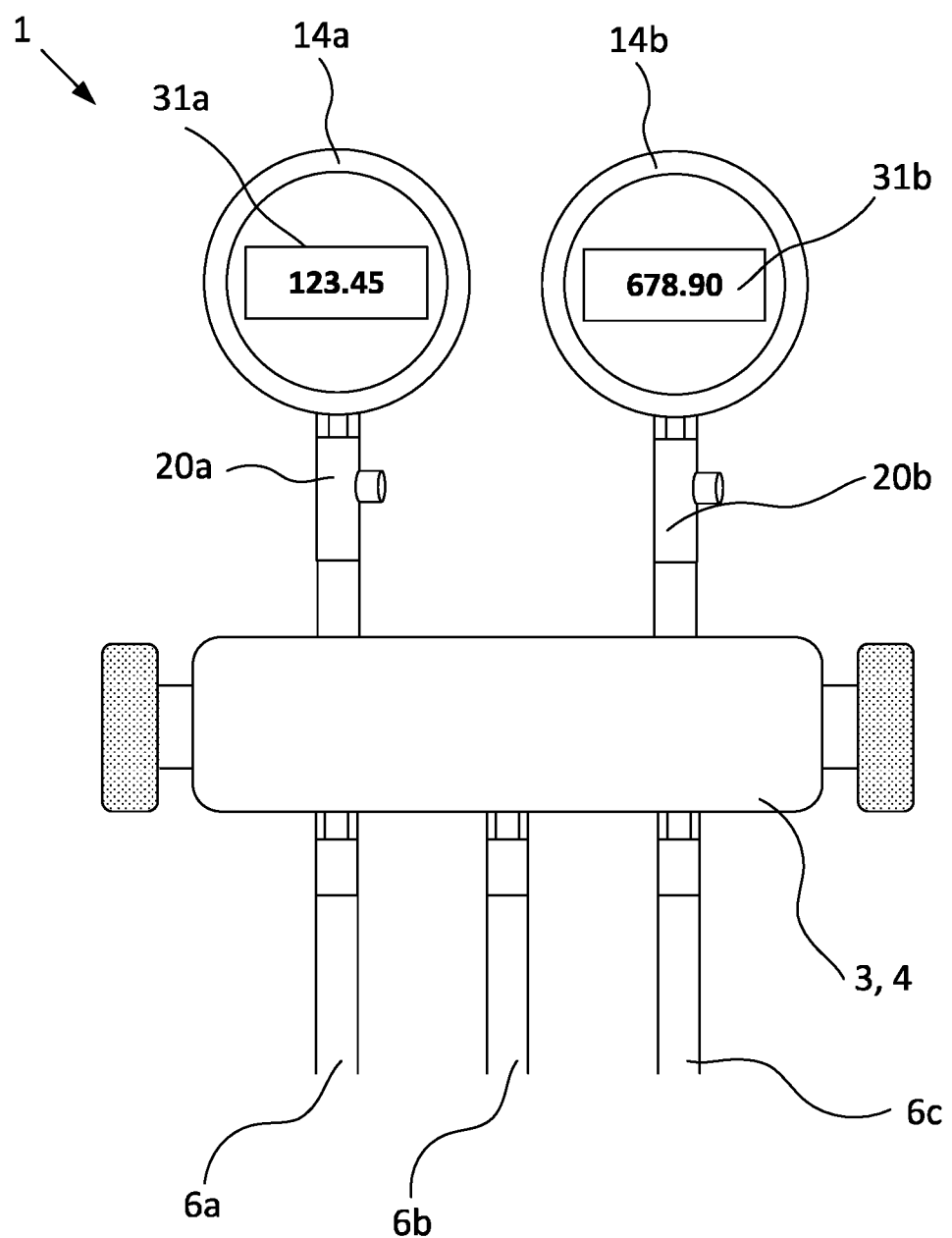
FIG. 4 shows a manifold gauge assembly with digital pressure gauges and two of the adapters of FIG. 2.

As shown in FIG. 4, the pressure gauges 14a, 14b of the manifold gauge assembly 1 may be digital pressure gauges 14a, 14b that include a digital display 31a, 31b. In this example, the adapters 20a, 20b can be mounted between the manifold 3 and each digital pressure gauge 14a, 14b in the same manner as described with reference to FIGS. 2 and 3.

The adapter 20 also includes a communications unit 22, for example a Bluetooth communications unit. The communications unit 22 is configured to receive a signal from the electronic pressure sensor 21 of the adapter 20 and communicate with a remote device.

Figure 5:
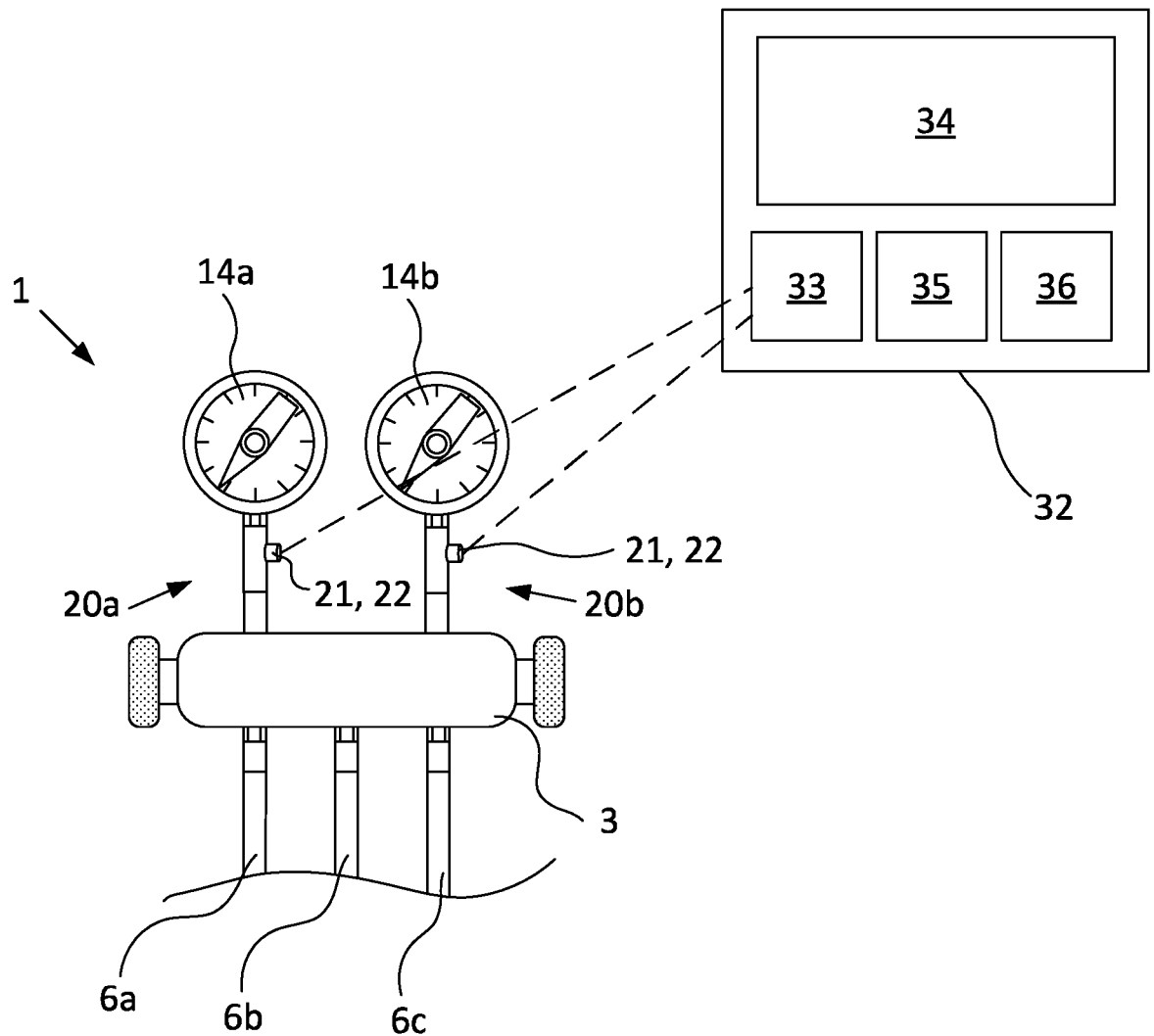
FIG. 5 shows the manifold gauge assembly of FIG. 3 and a remote device in communication with the adapters.

As illustrated in FIG. 5, the communications unit 22 receives data from the electronic pressure sensor 21 of the adapter 20, specifically the detected pressure, and communicates this to a remote device 32. The remote device 32 comprises a communications unit 33, preferably a receiver, for example a Bluetooth receiver. In various examples, the remote device 32 may be a mobile phone or a tablet computer, which may include an installed application for receiving the pressure data. Alternatively, the remote device 32 may be a specialised device, for example a controller of the air conditioning system 2, or air conditioning maintenance equipment.

As illustrated in FIG. 5, in examples in which the manifold gauge assembly 1 includes two pressure gauges 14a, 14b, an adapter 20a, 20b with an electronic pressure sensor 21 and a communications unit 22 may be provided for each pressure gauge 14a, 14b. In this case, each of the adapters 20a, 20b communicates with the remote device 32 via the communications unit 22 of each adapter 20a, 20b.

Figure 6:
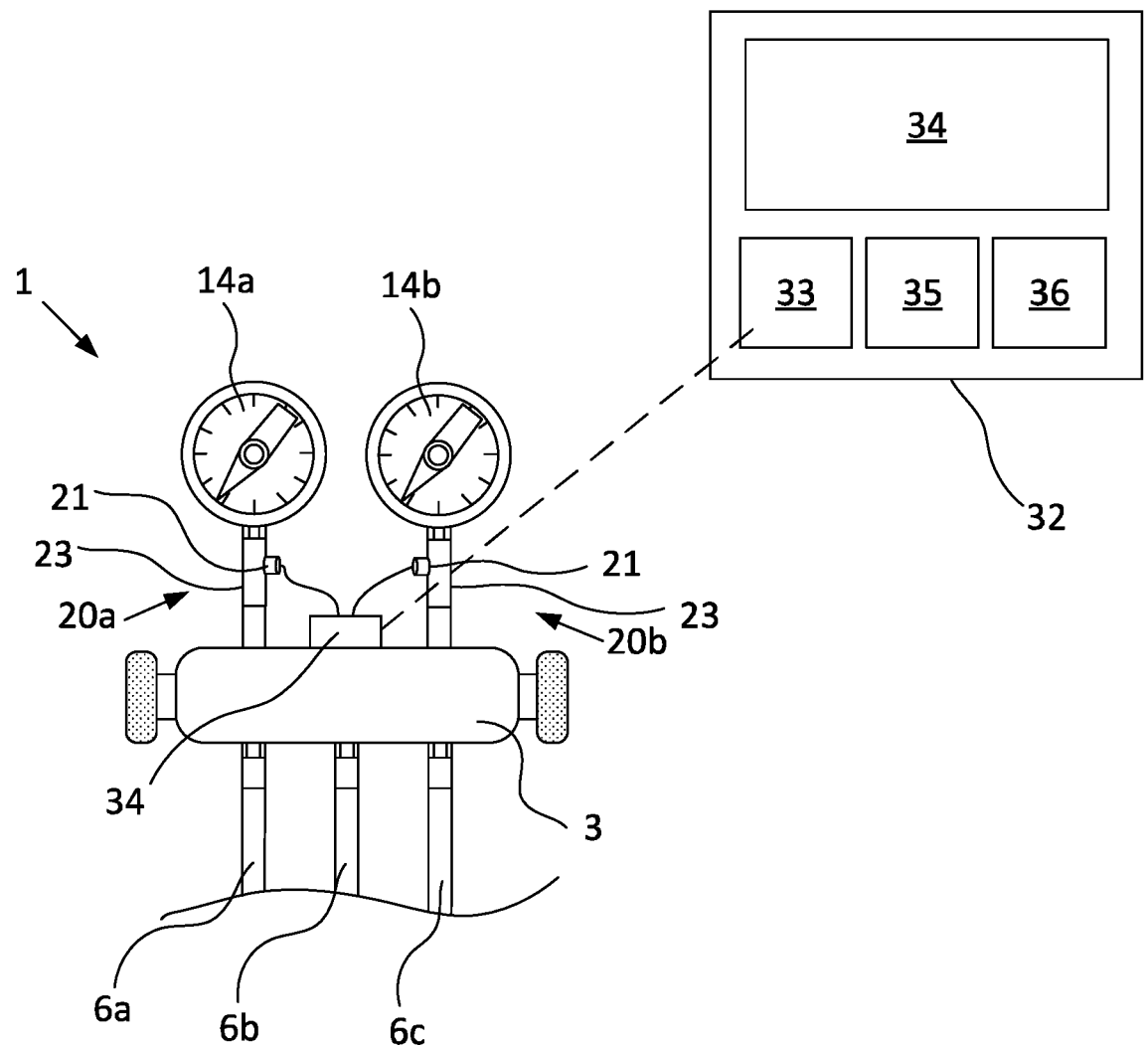
FIG. 6 shows a manifold gauge assembly with an alternative adapter, and a remote device in communication with the adapter.

Alternatively, as illustrated in FIG. 6, a single communications unit 34 may be provided for two or more adapters 20a, 20b that each have an electronic pressure sensor 21. In this example, the communications unit 34 is separate to the tubes 23 in which the electronic pressure sensors 21 are located, and the communications unit 34 is connected to each electronic pressure sensor 21 to receive pressure data from each of the electronic pressure sensors 21 and communicate to the remote device 32. The separate communications unit 34 may be attached to manifold 3 for convenience, as illustrated.

Preferably, the adapter 20 may also include a power source for powering the electronic pressure sensor 21 and/or the communications unit 22, 34. For example, the adapter 20 may include a battery or a connection to an external power source, such as mains electricity. In the example of FIG. 5, each of the adapters 20a, 20b may include a power source.

In the example of FIG. 6, a single power source may be provided to the communications unit 34, which in turn powers the electronic pressure sensors 21 of each adapter 20a, 20b, if needed.

The adapter 20 described with reference to FIGS. 2 to 6 therefore provides the detected pressure data to the remote device 32 for use in numerous ways during maintenance or commissioning of the air conditioning system 2. Meanwhile, the pressure gauges 14a, 14b on the manifold gauge assembly 1 display the same detected pressure, and so the technician can perform the maintenance or commissioning procedures in the manner to which they are accustomed, by relying on the displayed pressures on the pressure gauges 14a, 14b. Moreover, adapting the manifold gauge assembly 1 in this manner, by providing an adapter 20 with an electronic pressure sensor 21, is cheaper and easier than replacing the manifold gauge assembly 1 with a new manifold gauge assembly with built-in connectivity for a remote device.

The remote device 32 may comprise a display 34 for displaying the detected pressure. The remote device may include a memory 35 for storing the pressure data. The remote device 32 may include a processor 36 for processing the pressure data. The remote device may be used for logging the detected pressure, for example for monitoring a maintenance or commissioning procedure, for quality assurance, or for regulatory compliance. In further examples, the remote device 32 may control some other aspect of the air conditioning system 2 or maintenance apparatus used with the air conditioning system 2. In one example, the remote device 32 may control the refrigerant recovery unit 8 illustrated in FIG. 1B. In this way, the refrigerant recovery unit 8 may be operated in dependence on the pressure detected by the adapters 20a, 20b, for example the recovery unit 8 may be operated until the detected refrigerant pressure is zero, indicating that the refrigerant has been fully recovered. The remote device 32 may control an electronic actuator arranged to control the low side and/or high side valves 12a, 12b of the manifold 3, so that the valves 12a, 12b can be controlled in dependence on the detected pressures.

In various examples, the shape of the tube 23 of the adapter 20 may vary. For example, the tube 23 may be a T-junction having three connectors in any spatial arrangement, the connectors 28, 27 being for: the manifold 3, the pressure gauge 14, and an electronic pressure sensor 21.

Figure 7:
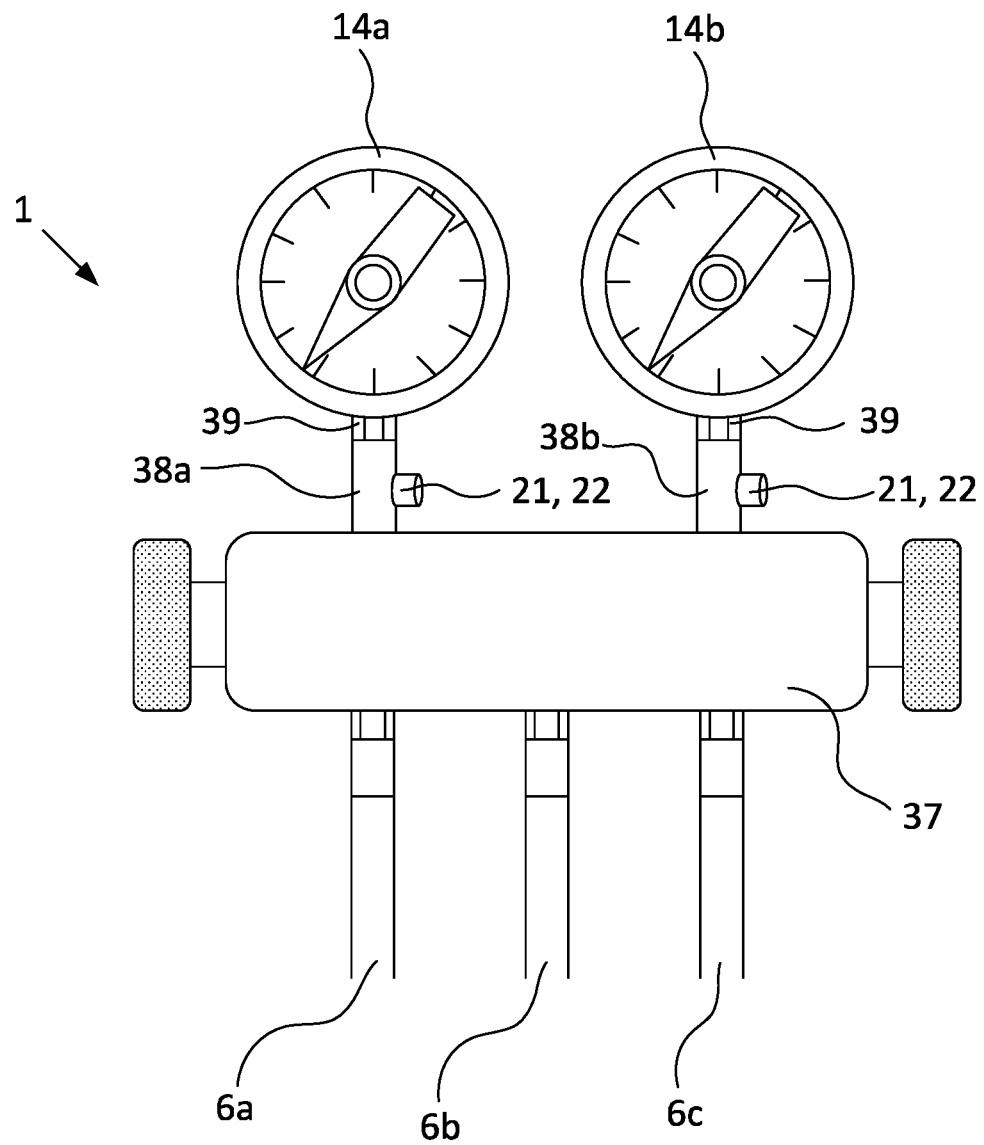
FIG. 7 shows a manifold gauge assembly with electronic pressure sensor arranged between the manifold and the pressure gauge.

FIG. 7 illustrates an alternative example manifold gauge assembly 1 in which the manifold 37 includes low side and high side connecting tubes 38a, 38b, each comprising an electronic pressure sensor 21 and a connector 39 for a pressure gauge 14a, 14b. The first and second connecting tubes 38a, 38b are fluidly connected to the low side and high side of the manifold 37, respectively, and the low side and high side pressure gauges 14a, 14b are attached to the connecting tubes 38a, 38b. Each connecting tube 38a, 38b may include a communications unit 22 configured to receive pressure data from one or both of the electronic pressure sensors 21 of the first and second connecting tubes 38a, 38b. In an alternative example similar to that illustrated in FIG. 6, a single communications unit may be provided to receive pressure date from the electronic pressure sensors 21 of both of the first and second connecting tubes 38a, 38b. The or each communications unit 22 therefore receives pressure data and communicates with a remote device 32 in the same manner as described with reference to FIGS. 2 to 6.

Figure 8:
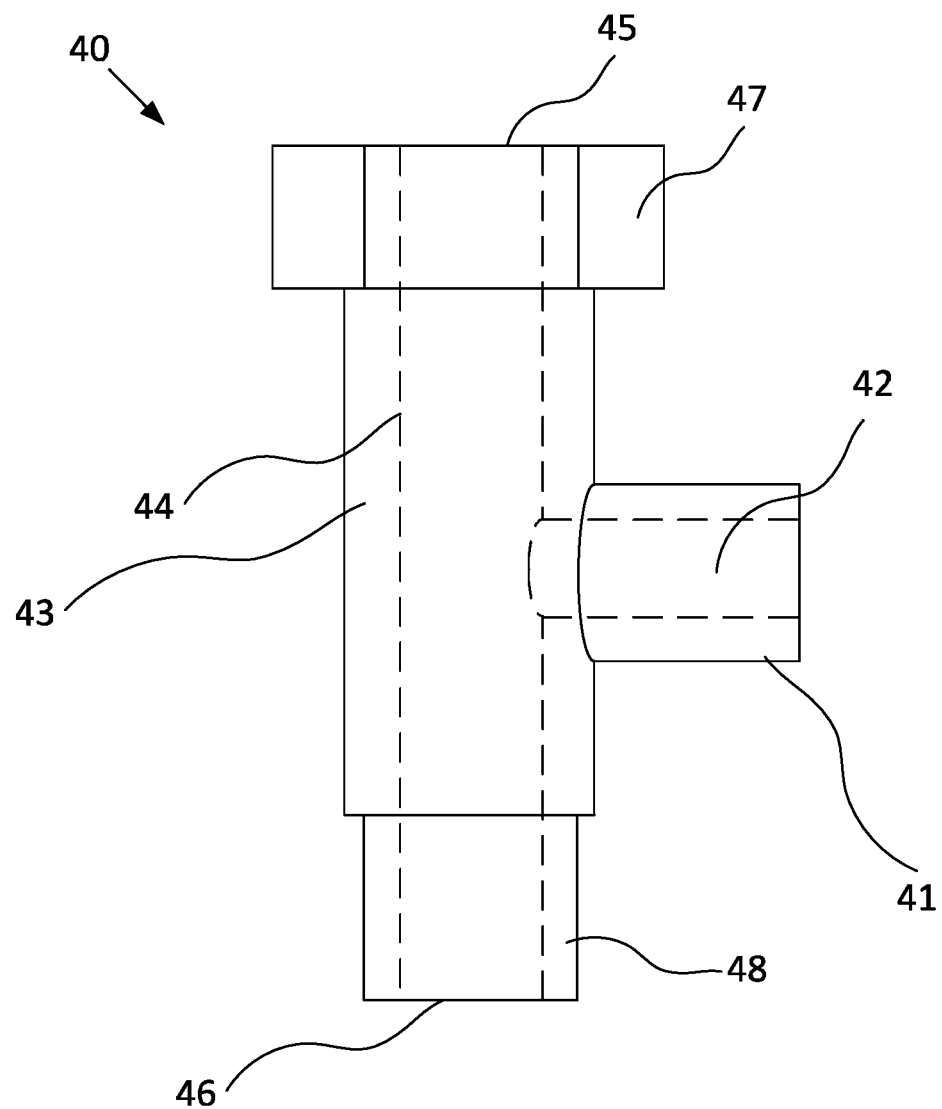
FIG. 8 shows an adapter tube for adapting a manifold gauge assembly for connection of a separate electronic pressure detector device.
Figure 9:
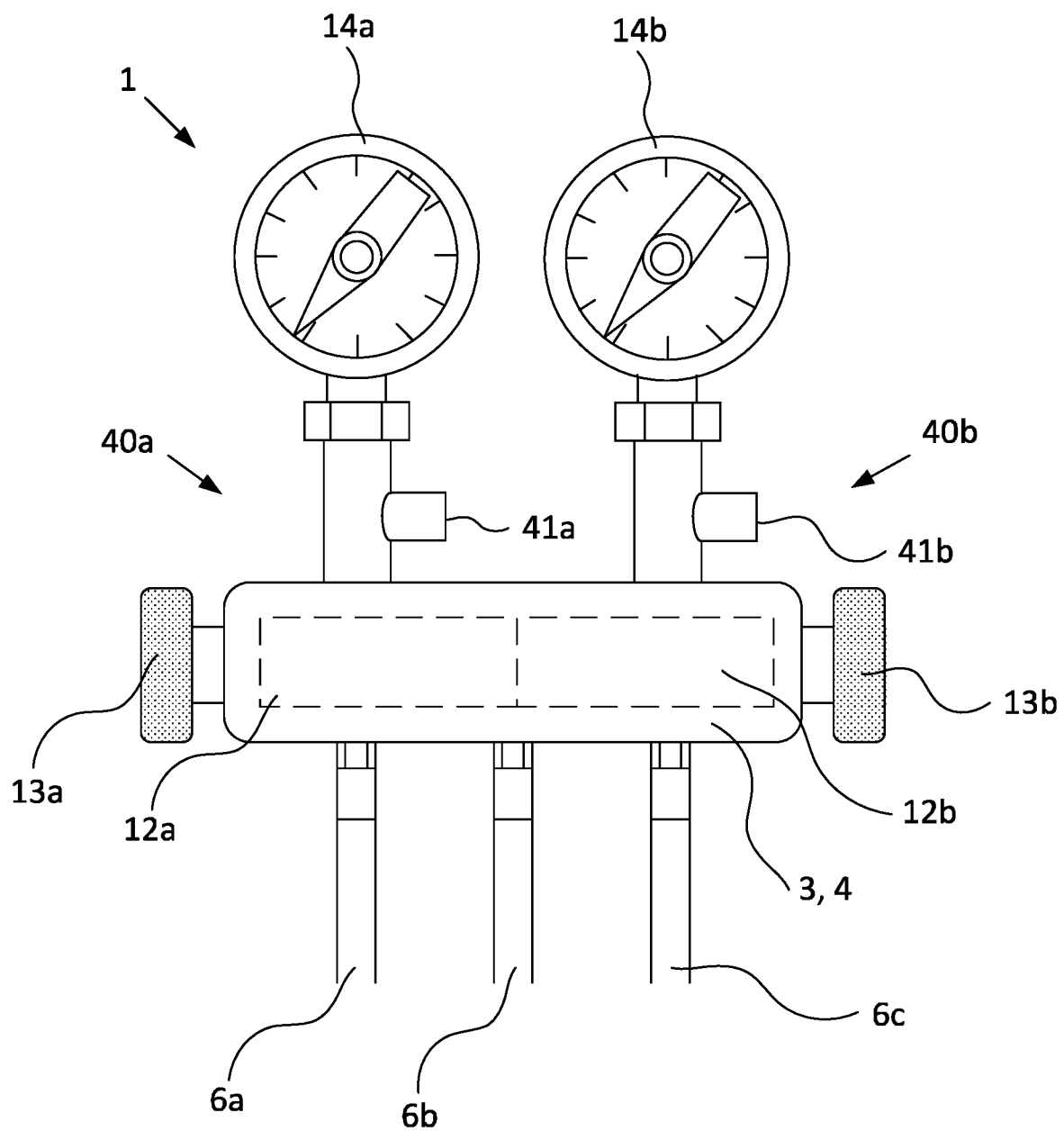
FIG. 9 shows a manifold gauge assembly including the adapter tube of FIG. 8.

FIG. 8 illustrates an adapter tube 40 for attachment between a manifold 3 and a pressure gauge 14, as shown in FIG. 9. The adapter tube 40 comprises a tube 43 that defines a fluid path 44 through the adapter tube 40 between a first end 45 and a second end 46. A first connector 47 is provided at the first end 45, and a second connector 48 is provided at the second end 46. The first connector 47 is configured for connection to a pressure gauge 14, and the second connector 48 is configured for connection to the manifold 3. Therefore, as shown in FIG. 9, the adapter tube 40 can be connected between the manifold 3 and a pressure gauge 14. In particular, the pressure gauge 14 is mounted to the manifold 3 by the adapter tube 40, in particular the tube 43. The adapter tube 40 is attached by disconnecting the pressure gauge 14a, 14b from the manifold 3, and then connecting the adapter tube 40 to the manifold 3 and to the pressure gauge 14. As shown in FIG. 9, a first adapter tube 40a is connected between the manifold 3 and the low pressure gauge 14a, and a second adapter tube 40b is connected between the manifold 3 and the high pressure gauge 14b.

The adapter tube 40 further comprises a third connector 41 for connection to a separate electronic pressure detector device (not illustrated). Such an electronic pressure detector device can be provided separately to the manifold 3 and adapter tube 40 and attached to the adapter tube 40 at the third connector 41. The third connector 41 comprises a fluid path 42 that joins the fluid path 44 in the tube 43. In this way, a separate electronic pressure detector device, for example a pressure gauge probe with Bluetooth connectivity, can be attached to the adapter tube 40 to detect a pressure in the manifold. Alternatively, the third connector 41 can be blocked or closed, for example capped, and the manifold 3 and pressure gauges 14a, 14b used as normal.

The separate electronic pressure detector device preferably has a communications unit for communicating with a remote device in the same manner as described with reference to FIGS. 5 and 6. The separate electronic pressure detector device may further comprise a display. The separate electronic pressure detector device may be a handheld pressure detector probe.

The first, second connectors 47, 48 of the adapter tube 40 are compatible with the connectors on the manifold 3 and the connectors on the pressure gauges 14a, 14b. Typically, the connectors 47, 48 are ⅛ inch (3.175 mm) NPT threaded connectors. As shown in FIG. 2, the first connector 47 preferably comprises a female threaded connector, including a locking nut, for connection to a male threaded connector of the pressure gauge 14a, 14b. The second connector 48 of the adapter tube 40 preferably comprises a male threaded connector for connection to a female threaded connector of the manifold 3. However, it will be appreciated that any type of connector or arrangement of connectors may alternatively be used to provide a connection between the adapter tube 40 and the manifold 3, and between the adapter tube 40 and the pressure gauge 14a, 14b. For example, a range of adapter tubes 40 with different size or type first and second connectors 47, 48 may be provided for compatibility with manifold gauge assemblies 1 having different connectors.

The third connector 41 of the adapter tube 40 preferably also comprises a threaded connector, for example a ⅛ inch NPT threaded connector. As illustrated, the third connector 41 of the adapter tube 40 preferably comprises a male threaded connector. However, it will be appreciated that the third connector 41 may alternatively comprise a female threaded connector, and that the size of the connector may vary.

Preferably, the first, second and third connectors 47, 48, 41 are threaded connectors having a thread size that is compatible with an industry standard, for example ⅛ inch NPT.

The adapter tube 40 illustrated in FIG. 8 may be provided, for example sold, for adapting a manifold gauge assembly 1 as shown in FIG. 9. This allows a separate electronic pressure detector device, for example a pressure gauge probe with Bluetooth connectivity, to be connected to the manifold gauge assembly 1 for electronic detection of the fluid pressure in the manifold 3. Similarly, the manifold gauge assembly 1 shown in FIG. 9 may be provided, for example sold, and the third connectors 41a, 41b of the adapter tubes 40a, 40b may be used for connecting a separate electronic pressure detector device, for example a pressure gauge probe with Bluetooth connectivity, for electronic detection of the fluid pressure in the manifold 3.

To adapt the manifold gauge assembly 1 of FIG. 1A to the manifold gauge assembly of FIG. 9, an adapter kit may be provided. The adapter kit may comprise an adapter tube 40 described with reference to FIG. 8, for connection between the manifold 3 and a pressure gauge, and an electronic pressure detector device, for example a pressure gauge probe, for connection to the third connector 41 of the adapter tube 40. In preferred examples, the adapter kit comprises two adapter tubes 40 and two electronic pressure detector devices, one for each pressure gauge 14a, 14b.

It will be appreciated that alternative examples of the manifold gauge assembly 1 comprise a single pressure gauge 14, and in this case only a single adapter 20 or adapter tube 40 of FIGS. 2 to 6, and FIG. 9 is attached between the manifold 3 and the single pressure gauge 14. Alternatively, the manifold 37 may comprise a single connecting tube 38 as described with reference to FIG. 7.

In summary, there is provided an adapter 20 for a manifold gauge assembly 1 for use on a fluid system, for example an HVAC-R system. The manifold gauge assembly 1 comprises a manifold 3 for connection to the fluid system, and a pressure gauge 14 arranged to detect a fluid pressure in the manifold 3. The adapter 20 comprises a tube 23 having connectors 27, 28 for fluidly connecting the adapter 20 to the pressure gauge 14 and to the manifold 3. The adapter also includes an electronic pressure sensor 21 arranged to detect a fluid pressure in the tube 23, and a communications unit 22 configured to receive data from the electronic pressure sensor 21 and to communicate with a remote device 32.

There is also provided a manifold gauge assembly 1 for use on a fluid system, for example an HVAC-R system. The manifold gauge assembly 1 comprises a manifold 3, 37 for connection to the fluid system, and a pressure gauge 14 arranged to detect a fluid pressure in the manifold 3, 37. The pressure gauge 14 has a display to display a detected pressure. An electronic pressure sensor 21 is arranged to detect a pressure between the manifold 3, 37 and the pressure gauge 14, and a communications unit 22 is arranged to receive data from the electronic pressure sensor 21 and to communicate with a remote device 32.

There is also provided a gauge manifold assembly 1 for use on a fluid system, for example an HVAC-R system. The manifold gauge assembly 1 comprises a manifold 3 for connection to the fluid system, and a pressure gauge 14 arranged to detect a fluid pressure in the manifold 3. The pressure gauge 14 has a display to display a detected pressure. The manifold gauge assembly 1 also includes an adapter tube 40 that comprises a first connector 46 for connection to the manifold 3, a second connector 47 for connection to the pressure gauge 14, and a third connector 41 for connection to an electronic pressure sensor. The manifold 3 is connected to the first connector 46 of the adapter tube 40 and the pressure gauge 14 is connected to second connector 47 of the adapter tube 40 such that the adapter tube 40 is connected between the pressure gauge 14 and the manifold 3.

Also provided is an adapter kit for a gauge manifold assembly 1 having a manifold 3 and a pressure gauge 14. The adapter kit includes an electronic pressure detector device that has an electronic pressure sensor and a connector. The adapter kit also has an adapter tube 40 that comprises a first connector 46 for connection to the manifold 3, a second connector 47 for connection to the pressure gauge 14, and a third connector 41 for connection to the connector of the electronic pressure detector device. The first, second and third connectors 46, 47, 41 are in fluid communication within the adapter tube 40 such that during use the pressure gauge 14 and the electronic pressure sensor are both arranged to detect a fluid pressure in the manifold 3.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A manifold gauge assembly for use on a fluid system, for example an HVAC-R system, the manifold gauge assembly comprising:
    a manifold for connection to the fluid system,
    a pressure gauge arranged to detect a fluid pressure in the manifold, the pressure gauge comprising a display to display a detected pressure,
    an electronic pressure sensor arranged to detect a pressure between the manifold and the pressure gauge, and
    a communications unit arranged to receive data from the electronic pressure sensor and to communicate with a remote device,
    wherein the electronic pressure sensor is disposed between the manifold and the pressure gauge, and
    wherein the manifold gauge assembly comprises a connecting tube disposed between the manifold and the pressure gauge, the connecting tube comprising a connector for removably connecting the pressure gauge to the connecting tube, and wherein the electronic pressure sensor is disposed in the connecting tube.

2. The manifold gauge assembly of claim 1, wherein the connecting tube further comprises a connector for removably connecting the connecting tube to the manifold.

3. The manifold gauge assembly of claim 1, wherein the connecting tube further comprises an opening, and wherein the electronic pressure sensor is disposed in the opening.

4. The manifold gauge assembly of claim 1, further comprising:
- a first pressure gauge arranged to detect a first fluid pressure in the manifold, and a second pressure gauge arranged to detect a second fluid pressure in the manifold, wherein each of the first pressure gauge and the second pressure gauge comprises a display to display a detected pressure,
- and wherein the manifold gauge assembly further comprises a first electronic pressure sensor arranged to detect pressure between the manifold and the first pressure gauge, and a second electronic pressure sensor arranged to detect pressure between the manifold and the second pressure gauge.

5. The manifold gauge assembly of claim 4, wherein the communications unit is configured to receive data from the first electronic pressure sensor and from the second electronic pressure sensor.

6. The manifold gauge assembly of claim 4, comprising a first communications unit configured to receive data from the first electronic pressure sensor, and a second communications unit configured to received data from the second electronic pressure sensor.

7. The manifold gauge assembly of claim 1, wherein the pressure gauge comprises an analog pressure gauge, and wherein the display comprises a dial.

8. The manifold gauge assembly of claim 1, wherein the pressure gauge comprises an electronic pressure gauge having an electronic pressure sensor, and wherein the display comprises a digital display.

* * * * *